(12) United States Patent
Lee et al.

(10) Patent No.: US 11,862,125 B2
(45) Date of Patent: Jan. 2, 2024

(54) ELECTRONIC DEVICE COMPRISING DISPLAY, AND OPERATION METHOD THEREOF

(71) Applicant: SAMSUNG ELECTRONICS CO., LTD., Suwon-si (KR)

(72) Inventors: Gwanghui Lee, Suwon-si (KR); Minwoo Lee, Suwon-si (KR); Minwoo Kim, Suwon-si (KR); Seungjin Kim, Suwon-si (KR); Woojun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/104,965

(22) Filed: Feb. 2, 2023

(65) Prior Publication Data

US 2023/0178050 A1 Jun. 8, 2023

Related U.S. Application Data

(63) Continuation of application No. PCT/KR2021/010218, filed on Aug. 4, 2021.

(30) Foreign Application Priority Data

Aug. 4, 2020 (KR) .................. 10-2020-0097607

(51) Int. Cl.
*G06F 3/041* (2006.01)
*G09G 5/12* (2006.01)

(52) U.S. Cl.
CPC ....... *G09G 5/12* (2013.01); *G09G 2320/0626* (2013.01); *G09G 2340/0435* (2013.01)

(58) Field of Classification Search
CPC ............. G09G 5/12; G09G 2320/0626; G09G 2340/0435; G09G 5/003; G09G 2320/06;
(Continued)

(56) References Cited

U.S. PATENT DOCUMENTS 6,498,626 B1 12/2002 Miller
7,605,794 B2 10/2009 Nurmi et al.
(Continued)

FOREIGN PATENT DOCUMENTS

CN 108628562 A 10/2018
JP 2002341840 A 11/2002
(Continued)

OTHER PUBLICATIONS

Written Opinion dated Nov. 23, 2021 by the International Searching Authority in International Application No. PCT/KR2021/010218.
(Continued)

*Primary Examiner* — Pegeman Karimi
(74) *Attorney, Agent, or Firm* — Sughrue Mion, PLLC

(57) ABSTRACT

On an electronic device which includes a display device comprising a display driving circuit, a processor, and a memory a method for changing a refresh rate of the display device includes: changing at least one of a first parameter, a second parameter, or a third parameter in response to identifying the occurrence of at least one of a scan rate change request or a change in scan rate change restriction, and applying the changed parameter among the first parameter, the second parameter, and the third parameter. The first parameter is the frequency of a first synchronization signal generated in the display driving circuit, the second parameter is the increase or decrease in a blank area to substitute for a portion of active video area in frame information, and the third parameter is the frequency of a second synchronization signal for rendering.

20 Claims, 9 Drawing Sheets

(58) Field of Classification Search
CPC ....... G09G 2330/021; G09G 2360/144; G09G 2340/0457; G06F 3/041; G06F 3/0416
See application file for complete search history.

(56) References Cited

U.S. PATENT DOCUMENTS

| | | | |
|---|---|---|---|
| 8,624,881 B2 | 1/2014 | Sakamoto | |
| 8,674,928 B2 | 3/2014 | Lee | |
| 9,524,694 B2 | 12/2016 | Wang et al. | |
| 10,019,968 B2 | 7/2018 | Bi et al. | |
| 10,565,936 B2 | 2/2020 | Ryu et al. | |
| 10,607,575 B2 | 3/2020 | Iwaki et al. | |
| 2011/0157256 A1 | 6/2011 | Sakamoto | |
| 2012/0206461 A1* | 8/2012 | Wyatt | G06F 1/3218 345/501 |
| 2016/0125785 A1 | 5/2016 | Wang et al. | |
| 2017/0193971 A1 | 7/2017 | Bi et al. | |
| 2018/0059868 A1* | 3/2018 | Brahma | G09G 3/2022 |
| 2018/0096670 A1 | 4/2018 | Iwaki et al. | |
| 2018/0158418 A1 | 6/2018 | Ryu et al. | |
| 2021/0248957 A1* | 8/2021 | Lee | G09G 3/3225 |
| 2022/0114956 A1* | 4/2022 | Lee | G09G 3/2092 |
| 2022/0351679 A1* | 11/2022 | Yang | G09G 3/2092 |

FOREIGN PATENT DOCUMENTS

| | | | |
|---|---|---|---|
| JP | 2006154224 A | 6/2006 | |
| JP | 2011138005 A | 7/2011 | |
| KR | 20010073253 A | 8/2001 | |
| KR | 20030080128 A | 10/2003 | |
| KR | 1020080070071 A | 7/2008 | |
| KR | 1020110069323 A | 6/2011 | |
| KR | 1020130097566 A | 9/2013 | |
| KR | 1020180065194 A | 6/2018 | |
| KR | 1020190058519 A | 5/2019 | |

OTHER PUBLICATIONS

International Search Report dated Nov. 23, 2021 by the International Searching Authority in International Application No. PCT/KR2021/010218.

* cited by examiner

ELECTRONIC DEVICE COMPRISING DISPLAY, AND OPERATION METHOD THEREOF

CROSS-REFERENCE TO RELATED APPLICATIONS

This application is a bypass continuation application of International Patent Application PCT/KR2021/010218, filed on Aug. 4, 2021, which claims priority to Korean Patent Application No. 10-2020-0097607, filed on Aug. 4, 2020 in the Korean Intellectual Property Office, the disclosures of which are incorporated by reference herein in their entireties.

BACKGROUND

1. Field

The disclosure relates to a method for efficiently changing a refresh rate of a display in an electronic device including the display, and an electronic device for providing the same.

2. Description of Related Art

A display is refreshed in a specific period. For example, when the refresh rate is 60 Hz, the screen of the display is refreshed at the rate of 60 frames per second. When a touch input is received to the screen of the display, or when an application is executed, the refresh rate of the display may be changed. However, when the electronic device is under a lower-illuminance environment in which the change of the refresh rate is easily viewed, the change of the refresh rate may be restricted. When the change of the refresh rate is restricted, the screen has to be continuously updated at a higher refresh rate. Accordingly, unnecessary current may be consumed.

SUMMARY

The disclosure relates to an electronic device, capable of reducing current consumption by changing a rendering rate seamlessly under the condition in which it is difficult to change the refresh rate seamlessly, and a method for operating the same.

In addition, the disclosure relates to an electronic device, capable of changing a refresh rate while increasing the efficiency in terms of the seamless change of the refresh rate, reactivity, the interference of a peripheral device, and current consumption through the combination of software modulation and hardware modulation, and a method for operating the same.

According to an embodiment of the disclosure, an electronic device may include a display device including a display driving circuit, a processor operatively connected to the display device, and a memory operatively connected to the processor. The memory may store at least one instruction which, when executed, causes the processor to identify whether at least one of a request for changing a refresh rate and a change of restriction in changing the refresh rate is made; change at least one of a first parameter, a second parameter, and a third parameter, in response to identifying that the at least one of the request for a the change of the refresh rate and a the change of restriction in the change of the refresh rate is made; and apply a changed parameter of the first parameter, the second parameter, and the third parameter. The first parameter may be a frequency of a first synchronization signal formed in the display driving circuit, the second parameter may be an increment or a decrement of a blank area in frame information to substitute for a portion of an active video area, and the third parameter may be a frequency of a second synchronization signal for rendering.

According to an embodiment of the disclosure, a method for changing a refresh rate by an electronic device may include identifying whether at least one of a request for changing a refresh rate and a change of restriction in changing the refresh rate is made; changing at least one of a first parameter, a second parameter, and a third parameter, in response to identifying that the at least one of the request for changing the refresh rate and the change of restriction in changing the refresh rate is made; and applying a changed parameter of the first parameter, the second parameter, and the third parameter. The first parameter may be a frequency of a first synchronization signal formed in the display driving circuit, the second parameter may be an increment or a decrement of a blank area in frame information to substitute for a portion of an active video area, and the third parameter may be a frequency of a second synchronization signal for rendering.

According to the electronic device of an embodiment of the disclosure, the current consumption may be reduced by changing the rendering rate seamlessly under the condition in which it is difficult to change the refresh rate seamlessly.

According to the electronic device of an embodiment of the disclosure, the refresh rate may be changed while increasing the efficiency in terms of the seamless change of the refresh rate, the reactivity, the interference of the peripheral device, and the current consumption through the combination of software modulation and hardware modulation, Besides, a variety of effects directly or indirectly understood through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 1:
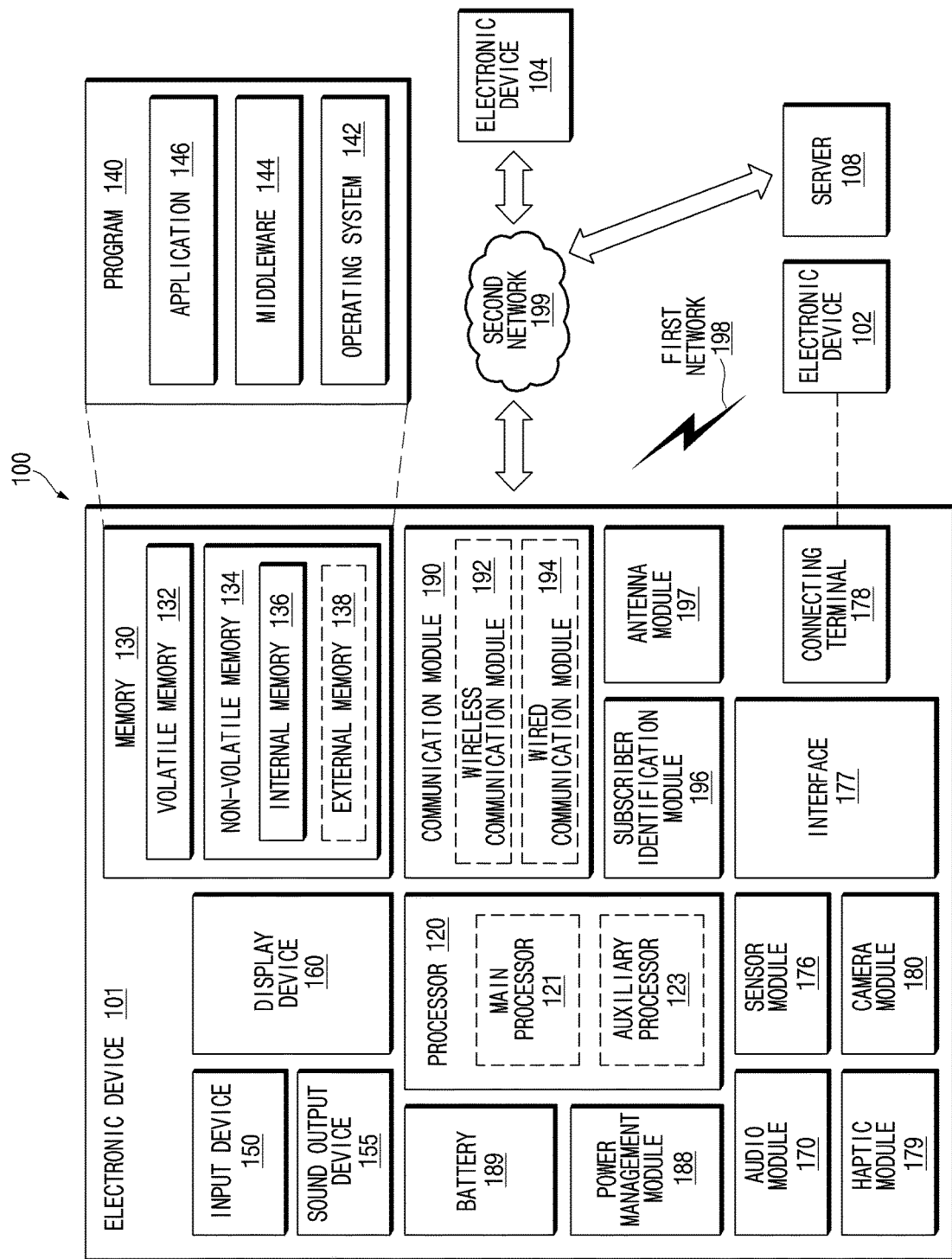
FIG. 1 is a block diagram of an electronic device in a network environment, according to an embodiment.

With regard to descriptions of the drawings, the same or similar components will be marked by the same or similar reference signs.

DETAILED DESCRIPTION

Hereinafter, various embodiments of the disclosure are described with reference to the accompanying drawings.

However, it is not intended to limit the disclosure to specific embodiments, and it should be understood that various modifications, equivalents, and/or alternatives of embodiments of the disclosure are included.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100, according to an embodiment.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device or module 150, a sound output device or module 155, a display device or module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

A "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). A "device" may be equivalent to a module within another device, or it may be its own structure.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
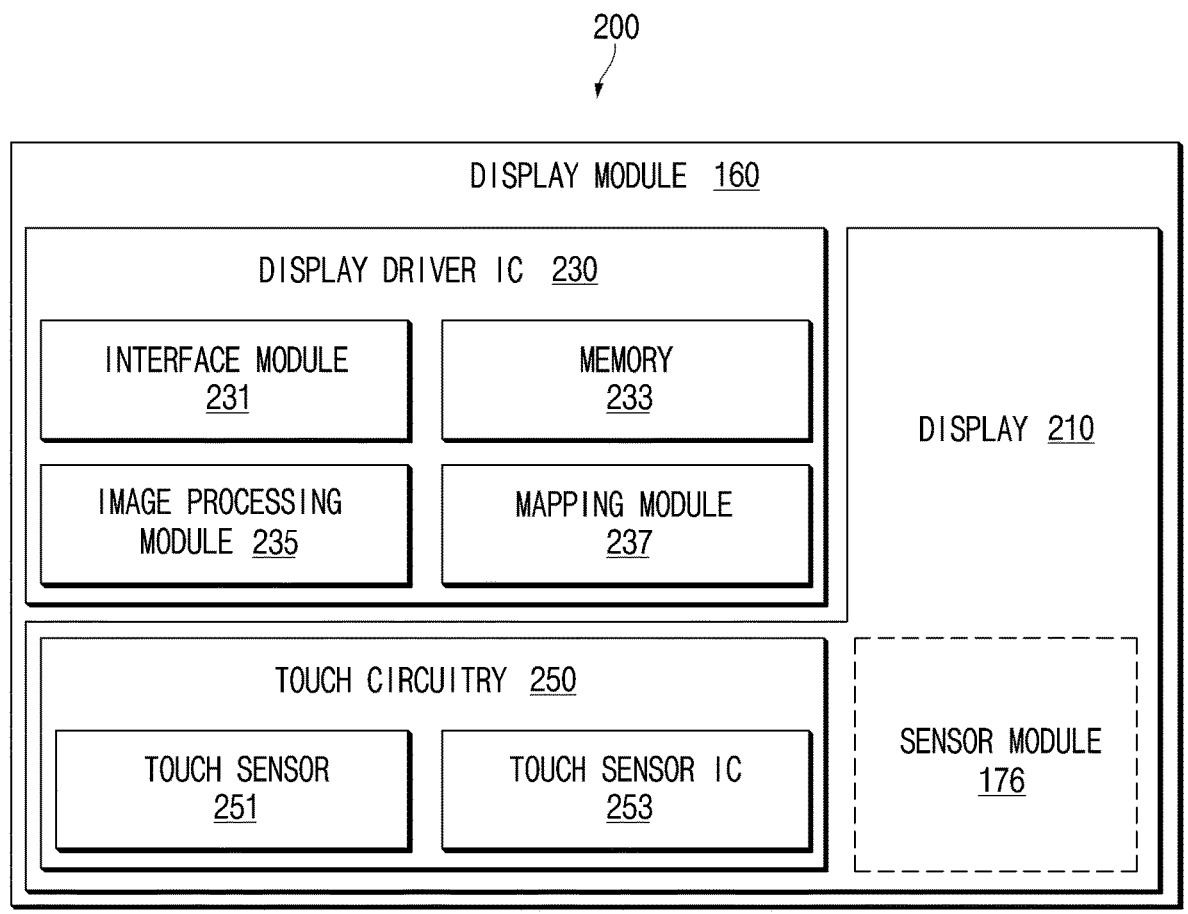
FIG. 2 is a block diagram of a display device, according to an embodiment.

FIG. 2 is a block diagram 200 illustrating the display module 160, according to an embodiment.

Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry serving as part or all of the input device 150, or the sensor module 176, via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or touch circuitry serving as part or all of the input device 150)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
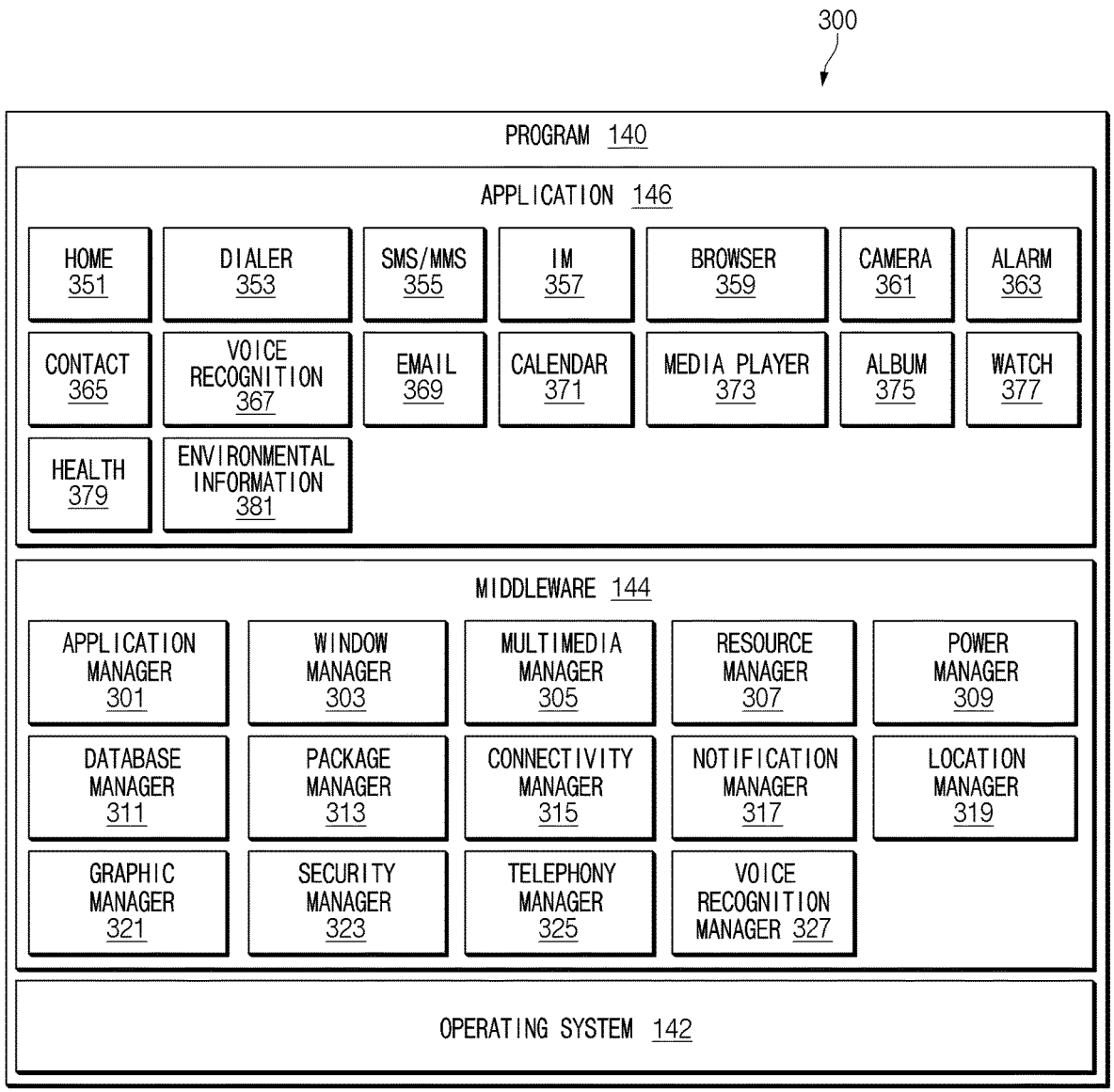
FIG. 3 is a block diagram of a program, according to an embodiment.

FIG. 3 is a block diagram 300 illustrating the program 140, according to an embodiment. According to an embodiment, the program 140 may include an operating system (OS) 142 to control one or more resources of the electronic device 101, middleware 144, or an application 146 executable in the OS 142. The OS 142 may include, for example, Android™ iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327.

The application manager 301, for example, may manage the life cycle of the application 146. The window manager 303, for example, may manage one or more graphical user interface (GUI) resources that are used on a screen. The multimedia manager 305, for example, may identify one or more formats to be used to play media files, and may encode or decode a corresponding one of the media files using a codec appropriate for a corresponding format selected from the one or more formats. The resource manager 307, for example, may manage the source code of the application 146 or a memory space of the memory 130. The power manager 309, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 309 may interwork with a basic input/output system (BIOS) (not shown) of the electronic device 101.

The database manager 311, for example, may generate, search, or change a database to be used by the application 146. The package manager 313, for example, may manage installation or update of an application that is distributed in the form of a package file. The connectivity manager 315, for example, may manage a wireless connection or a direct connection between the electronic device 101 and the external electronic device. The notification manager 317, for example, may provide a function to notify a user of an occurrence of a specified event (e.g., an incoming call, message, or alert). The location manager 319, for example, may manage locational information on the electronic device 101. The graphic manager 321, for example, may manage one or more graphic effects to be offered to a user or a user interface related to the one or more graphic effects.

The security manager 323, for example, may provide system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home application 351, dialer application 353, short message service (SMS)/multimedia messaging service (MMS) application 355, instant message (IM) application 357, browser application 359, camera application 361, alarm application 363, contact application 365, voice recognition application 367, email application 369, calendar application 371, media player application 373, album application 375, watch application 377, health application 379 (e.g., for measuring the degree of workout or biometric information, such as blood sugar), and/or environmental information application 381 (e.g., for measuring air pressure, humidity, or temperature information). According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 369) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Hereinafter, the operation of the electronic device according to an embodiment will be described with reference to FIG. 4.

Figure 4:
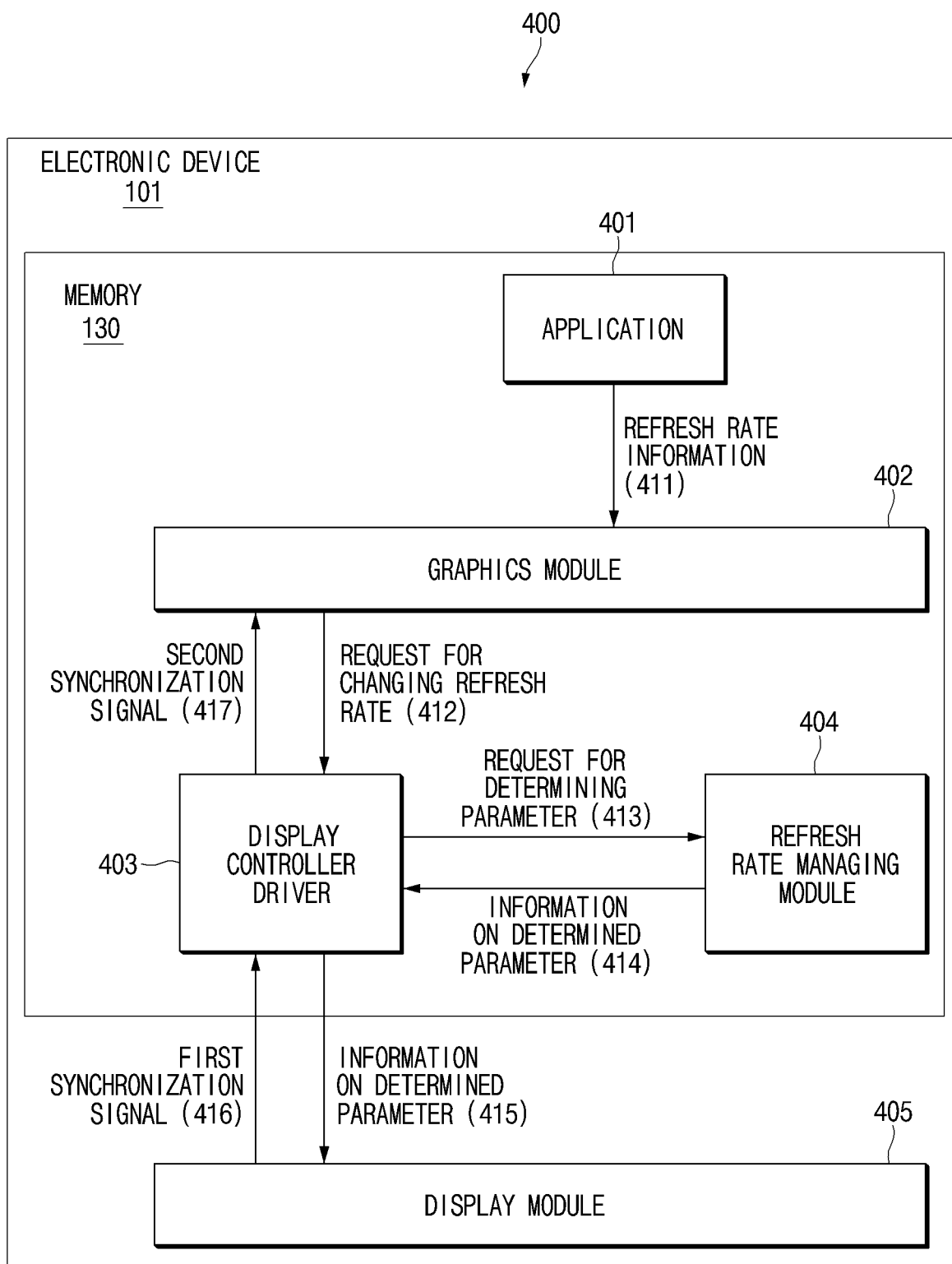
FIG. 4 is a block diagram illustrating a configuration of an electronic device, according to an embodiment.

FIG. 4 is a block diagram 400 illustrating the configuration of an electronic device 101, according to an embodiment. According to an embodiment, the same components as those of the above described embodiment will be assigned with the same reference numerals, and the duplication thereof will be omitted.

Referring to FIG. 4, the electronic device 101 may include the memory 130 (e.g., the memory 130 in FIG. 1) and a display module 405 (e.g., the display module 160 in FIG. 2). According to an embodiment, the memory 130 may include an application 401 (e.g., the application 146 in FIG. 3), a graphics module 402 (e.g., the graphic manager 321 in FIG. 3), a display controller driver 403, and a refresh rate managing module 404. According to an embodiment, the display module 405 may be operated by the display driver IC included in the display module 405, and the operations of the application 401, the graphics module 402, the display controller driver 403, and the refresh rate managing module 404 may be performed in the memory, by a processor (e.g., the processor 120 of FIG. 1) of the electronic device 101, which is operatively connected to the memory 130 of the electronic device 101.

According to an embodiment, the application 401 of the electronic device 101 may include information on a refresh rate required to execute the application 401. According to an embodiment, as the application 401 is executed, the application 401 may transmit the refresh rate information 411 required for the application 401 to the graphics module 402.

According to an embodiment, the graphics module 402 may determine a target refresh rate, based on the received refresh rate information. According to an embodiment, the graphics module 402 may transmit a request 412 to the display controller driver 403 to change the refresh rate to the determined target refresh rate. For example, the graphics module 402 may receive multiple pieces of refresh rate information from a plurality of applications 401 and may determine the target refresh rate based on the highest refresh rate of the received multiple pieces of refresh rate information. For another example, when receiving the multiple pieces of refresh rate information from the plurality of applications 401, the graphics module 402 may determine the target refresh rate, based on a refresh rate of an application displayed in the foreground. According to an embodiment, the display controller driver 403 may be a driver to control a display controller at the hardware stage, and the display controller may transmit information on a frame to the display module 405 in response to a first synchronization signal (e.g., TE-VSYNC) received from the display driving circuit (e.g., the display driver IC 230 in FIG. 2).

According to an embodiment, the display controller driver 403 may transmit a request 413 to the refresh rate managing module 404 to determine a parameter, which is to be controlled, of a first parameter, a second parameter, and a third parameter, to change the refresh rate to the received target refresh rate.

According to an embodiment, the first parameter, which serves as a parameter for controlling the refresh rate through the hardware configuration, may represent a frequency (Hz) of the first synchronization signal (e.g., TE-VSYNC). According to an embodiment, the first synchronization signal may be a signal formed based on the hardware synchronization signal (e.g., HW-VSYNC) generated inside the display driving circuit (e.g., the display driver IC 230 of FIG. 2) included in the display module 405. According to an embodiment, the first synchronization signal may be generated from the display driving circuit, may be transmitted to the processor, and may be sensed by the display controller driver 403 operating in the processor. According to one embodiment, when the frequency of the hardware synchronization signal (e.g., HW-VSYNC) is 120 Hz, and when the refresh rate managing module 404 changes the first parameter to 60 Hz, even if the hardware synchronization signal is generated 120 times per second, the first synchronization signal (e.g., TE-VSYNC) may be generated 60 times per second. The first synchronization signal is generated with respect to one of every two hardware synchronization signals (e.g., HW-VSYNC) while skipping a remaining one of two hardware synchronization signals (e.g., HW-VSYNC).

According to an embodiment, the second parameter, which is a parameter for controlling a refresh rate through a hardware configuration, may indicate the increment or the decrement of a "blank" in information on one frame, to substitute for a portion of an active video area. According to an embodiment, an area or duration for the blank may be controlled, based on at least one of a waiting time (a vertical back porch; VBP) to output a vertical signal, a waiting time (a vertical front porch; VFP) after outputting a vertical signal, a waiting time (horizontal back porch; HBP) to output a horizontal signal, and/or a waiting time (horizontal front portion; HFP) after outputting a horizontal signal. According to an embodiment, the second parameter may indicate the increment or the decrement of the waiting time (VFP) after outputting the vertical signal. According to an embodiment, when one frame information is completely output on the display of the display module 405 (e.g., the display 210 in FIG. 2), the hardware synchronization signal (e.g., HW-VSYNC) may be generated. According to an embodiment, a period of generating the hardware synchronization signal (e.g., HW-VSYNC) may be increased by increasing the blank area in the one frame information. In other words, the frequency of the hardware synchronization signal (e.g., HW-VSYNC) may be reduced by increasing the second parameter. For example, when the refresh rate managing module 404 increases the second parameter, the display controller driver 403 controls the display module 405 to increase the waiting time (VFP) after outputting the vertical signal, thereby decreasing the frequency of the hardware synchronization signal (e.g., HW-VSYNC).

According to an embodiment, the third parameter, which serves as a parameter for controlling the refresh rate through the software configuration, may represent a frequency (Hz) of the second synchronization signal (e.g., SW-VSYNC). According to an embodiment, the second synchronization signal (e.g., SW-VSYNC) may be a signal generated based on the first synchronization signal (e.g., TE-VSYNC) received by the display controller driver 403. According to an embodiment, the display controller driver 403 may generate the second synchronization signal (e.g., SW-VSYNC) and transmit the second synchronization signal to the graphics module 402. According to one embodiment, when the frequency of the hardware synchronization signal (e.g., HW-VSYNC) is 120 Hz, when the first parameter is 120 Hz, and when the refresh rate managing module 404 changes the second parameter to 60 Hz, even if the first synchronization signal (e.g., TE-VSYNC) is generated 120 times per second, the second synchronization signal (e.g., SW-VSYNC) may be generated 60 times per second. The second synchronization signal is generated with respect to one of every two first synchronization signals (e.g., TE-VSYNC) while skipping a remaining one of the two first synchronization signals (e.g., TE-VSYNC), for every two first synchronization signals (e.g., TE-VSYNC). According to one embodiment, when the frequency of the hardware synchronization signal (e.g., HW-VSYNC) is 120 Hz, when the first parameter is 60 Hz, and when the refresh rate managing module 404 changes the second parameter to 30 Hz, even if the hardware synchronization signal (e.g., HW-VSYNC) is generated 120 times per second, the first synchronization signal (e.g., TE-VSYNC) is generated 60 times per second. The first synchronization signal is generated with respect to one of every two hardware synchronization signals (e.g., HW-VSYNC) while skipping a remaining one of two hardware synchronization signals (e.g., HW-VSYNC). In this case, when the first synchronization signal (e.g., TE-VSYNC) is generated 60 times per second, the second synchronization signal (e.g., SW-VSYNC) may be generated 30 times per second. The second synchronization signal is generated based on one of every two first synchronization signals (e.g., TE-VSYNC) while skipping a remaining one of two first synchronization signals (e.g., TE-VSYNC).

According to an embodiment, the refresh rate managing module 404 may determine a parameter, which is to be controlled, of the first parameter, the second parameter, and the third parameter, to change the refresh rate to the received target refresh rate. According to an embodiment, the first parameter, the second parameter, and the third parameter may have the features as shown in Table 1.

TABLE 1

| Method for changing refresh rate to target refresh rate | Visibility degree for change of refresh rate | Current consumption | Switching rate |
|---|---|---|---|
| First parameter (frequency (Hz) of first synchronization signal) changed | Low | High | Fast |
| Second parameter (proportion of blank area) changed | High | Low | Slow |
| Third parameter (frequency (Hz) of second synchronization signal) changed | Low | High | Fastest |

In Table 1, "high", "low", "fast", and "slow" may be values relative to each other. Referring to Table 1, when the first parameter is changed according to an embodiment, the consumption current may be higher. However, the rate of changing the refresh rate is faster when the first parameter is changed, and the change in the display screen is lower (e.g., a screen shuttering phenomenon, a color change, and/or a brightness change) when the refresh rate is changed. Accordingly, the visibility (the degree of visibly recognizing the change of the refresh rate) in the change of the refresh rate is lower. In addition, according to an embodiment, when the first parameter is changed to reduce the refresh rate, as a portion of the first synchronization signal (e.g., TE-VSYNC) is omitted. Accordingly, the operation of the processor (e.g., the processor 120 of FIG. 1) operating in synchronization with the first synchronization signal slows down.

However, referring to Table 1, according to an embodiment, when the second parameter is changed, the rate of changing the refresh rate is slower and the degree of the change (e.g., a screen shuttering phenomenon, a color change, and/or a brightness change) of the display screen is higher when the refresh rate is changed, such that the visibility degree (the degree of visibly recognizing the change of the refresh rate) in the change of the refresh rate is higher. However, the change of the second parameter may reduce the current consumption.

In addition, referring to Table 1, according to an embodiment, when the third parameter is changed, the consumption current may be higher. However, when the third parameter is changed, the rate of changing the refresh rate is fastest and the change (e.g., a screen shuttering phenomenon, a color change, and/or a brightness change) of the display screen is lower when the refresh rate is changed, such that the visibility degree (the degree of visibly recognizing the change of the refresh rate) in the change of the refresh rate is lower.

According to an embodiment, the refresh rate managing module 404 may determine a parameter, which is to be controlled, of the first parameter, the second parameter, and the third parameter, depending on the environment of ambient illuminance of the electronic device 101, whether the electronic device 101 displays a still image, the size of the display of the electronic device 101, the type of a display panel included in the electronic device 101, the interference state of the frequency of a peripheral device of the display panel, the required reactivity, and/or the current consumption. According to an embodiment, the refresh rate managing module 404 may make a determination of changing at least one of the first parameter, the second parameter, or the third parameter, such that the refresh rate is changed to the received target refresh rate.

For example, when the ambient illuminance of the electronic device 101 is higher, the visibility degree for the change of the refresh rate becomes lowered. Accordingly, when the second parameter is changed, the current consumption may be lowest. Accordingly, the refresh rate managing module 404 may make a determination of changing the second parameter to correspond to the target refresh rate.

To the contrary, according to an embodiment, when the ambient illuminance of the electronic device 101 is lower, the visibility degree for the change of the refresh rate is higher. Accordingly, the refresh rate managing module 404 may make a determination of changing the third parameter, which makes the lower visibility degree for the change of the refresh rate, to correspond to the target refresh rate, instead of changing the second parameter making the higher visibility degree for the change of the refresh rate. In addition, thereafter, when the ambient illuminance of the electronic device 101 is changed to be higher, the refresh rate managing module 404 may gradually change the first parameter and/or the second parameter to correspond to the target refresh rate to reduce the current consumption.

The change of the refresh rate is viewed with higher visibility under the surrounding environment of lower illuminance or lower brightness. Accordingly, a conventional electronic device is restricted from changing the refresh rate. Accordingly, when the higher refresh rate is not required (e.g., while the still screen image is displayed), the refresh rate fails to be lowered under the surrounding environment of the lower illuminance or the lower brightness. Accordingly, the rendering may be more frequently performed, so current is more consumed. However, according to the electronic device 101 of the embodiment of the disclosure, the refresh rate managing module 404 may change the third parameter, which makes the lower visibility degree for the change of the refresh rate, to correspond to the target refresh rate under the environment making the lower visibility degree for the change of the refresh rate, thereby decreasing the number times of rendering and reducing current consumption. In addition, when the electronic device 101 deviates from the environment making the higher visibility for the change of the refresh rate, the refresh rate managing module 404 may change the first parameter and/or the second parameter to correspond to the target refresh rate, thereby more reducing the number of times of generating the hardware synchronization signal (e.g., HW-VSYNC) and/or the first synchronization signal (e.g., TE-VSYNC). To the contrary, when a higher refresh rate is required under the surrounding environment of the lower illuminance or the lower brightness (e.g., when a more rapid response is required at a higher refresh rate, as a touch input of a user is made), according to the electronic device 101 of an embodiment of the disclosure, the refresh rate managing module 404 first changes the third parameter, which makes the lower visibility for the change of the refresh rate, to correspond to the target refresh rate, such that the electronic device 101 changes the refresh rate even under the environment making the higher visibility for the change of the refresh rate.

According to an embodiment, the following description will be made in detail with reference to FIGS. 7 to 9, regarding a condition of determining the change of at least one of the first parameter, the second parameter, or the third parameter.

According to an embodiment, the refresh rate managing module 404 may make a determination of changing at least one of the first parameter, the second parameter, or the third parameter to change the refresh rate to the received target refresh rate, and may transmit information 414 on the determined parameter to the display controller driver 403.

According to an embodiment, the display controller driver 403 may transmit, to the display module 405, information 415 on the first parameter and/or the second parameter changed, when the first parameter and/or the second parameter is changed, based on the information on the determined parameter.

According to an embodiment, the display controller driver 403 may update the frequency of the second synchronization signal (e.g., SW-VSYNC), based on information on the third parameter changed, when the third parameter is changed, based on the information on the determined parameter.

According to an embodiment, when the display module 405 receives the information on the first parameter and/or the second parameter changed, the display module 405 may generate the first synchronization signal (e.g., TE-VSYNC) to correspond to the first parameter and/or the second parameter changed and may transmit the first synchronization signal 416 (e.g., TE-VSYNC) to the display controller driver 403. According to an embodiment, when the first parameter is changed, the display module 405 may omit generating the first synchronization signal (e.g., TE-VSYNC), which corresponds to the hardware synchronization signal (e.g., HW-VSYNC) at a specific period, to correspond to the first parameter. According to an embodiment, when the second parameter is changed, the display module 405 may control at least one of the waiting time (the vertical back porch; VBP) to output a vertical signal, the waiting time (a vertical front porch; VFP) after outputting the vertical signal, the waiting time (horizontal back porch; HBP) to output the horizontal signal, and/or the waiting time (horizontal front portion; HFP) after outputting the horizontal signal, to correspond to the second parameter. According to an embodiment, the display module 405 may generate the hardware synchronization signal (e.g., HW-VSYNC) and the first synchronization signal (e.g., TE-VSYNC) and may transmit the first synchronization signal 416 (e.g., TE-VSYNC) to the display controller driver 403, when the information on one frame is completely output, by changing the at least one of the waiting time (the vertical back porch; VBP) to output a vertical signal, the waiting time (a vertical front porch; VFP) after outputting the vertical signal, the waiting time (horizontal back porch; HBP) to output the horizontal signal, and/or the waiting time (horizontal front portion; HFP) after outputting the horizontal signal.

According to an embodiment, the display controller driver 403 may generate the second synchronization signal (e.g., SW-VSYNC) to correspond to the received first synchronization signal (e.g., TE-VSYNC) and transmit the second synchronization signal 417 to the graphics module 402. Although the display controller driver 403 generates the second synchronization signal (e.g., SW-VSYNC) to correspond to the received first synchronization signal (e.g., TE-VSYNC), when the third parameter is changed according to an embodiment, the display controller driver 403 may generate the second synchronization signal (e.g., SW-VSYNC) to correspond to the changed third parameter. According to an embodiment, when the second parameter is changed, the display controller driver 403 may omit generating the second synchronization signal (e.g., SW-VSYNC) corresponding to the first synchronization signal (e.g., TE-VSYNC), to correspond to the second parameter.

According to an embodiment, the graphics module 402 may render the information on a frame to correspond to the received second synchronization signal (e.g., SW-VSYNC).

Hereinafter, the operation of the electronic device according to an embodiment will be described with reference to FIG. 5.

Figure 5:
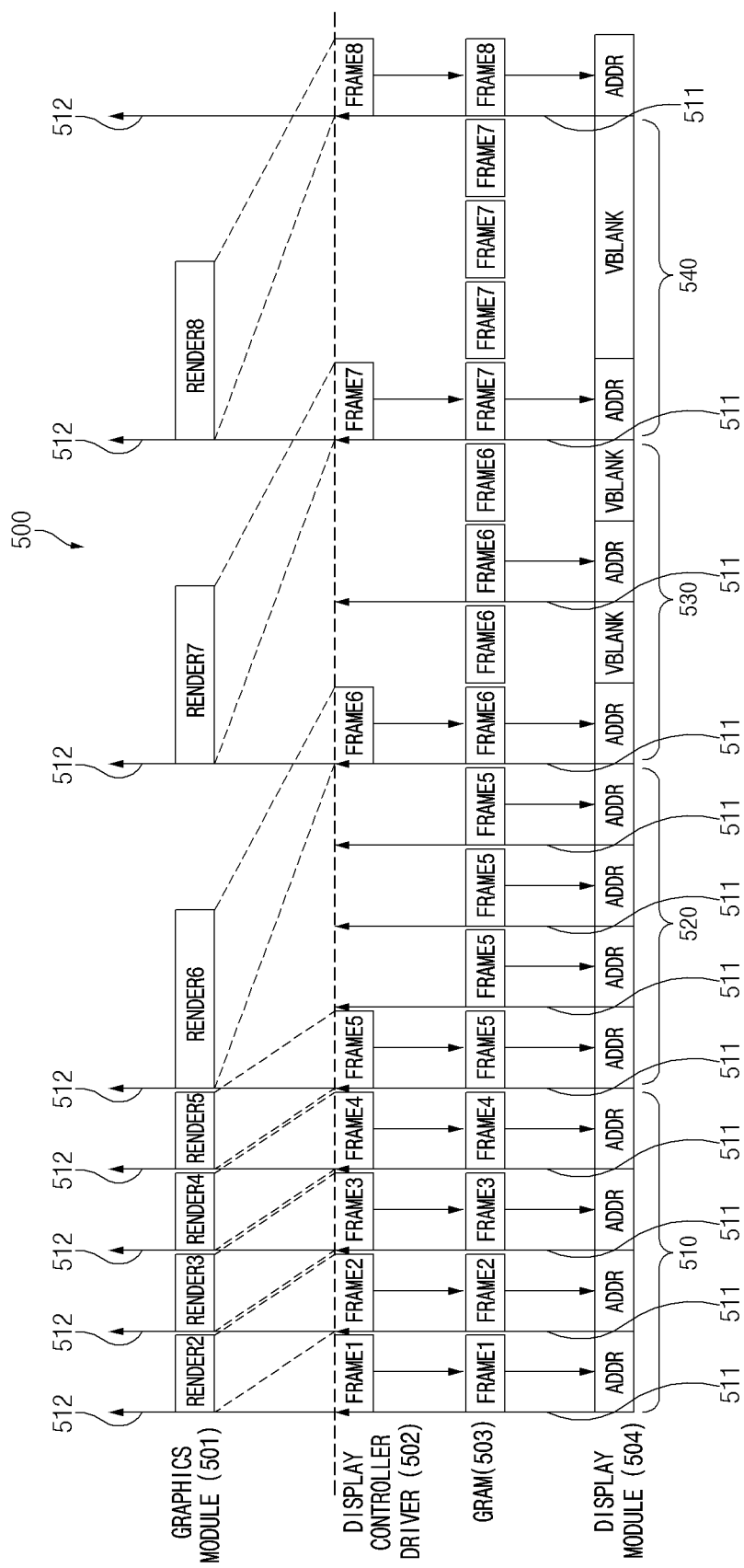
FIG. 5 is a view illustrating an operation of an electronic device, until the electronic device outputs a frame to a display, according to an embodiment.

FIG. 5 is a diagram 500 illustrating an operation of an electronic device, until the electronic device outputs a frame to a display, according to an embodiment.

Referring to FIG. 5, the electronic device (e.g., the electronic device 101 of FIG. 1) may include a graphics module 501, a display controller driver 502, a GRAM 503, and a display module 504.

According to an embodiment, a first duration 510 will be described below. According to an embodiment, for the first duration 510, the refresh rate of the display module 504 may be 120 Hz, the first parameter may be 120 Hz, the second parameter may be 0, and the third parameter 120 Hz.

According to an embodiment, the display controller driver 502 may receive a first synchronization signal (e.g., TE-VSYNC) 511 from the display module 504. According to an embodiment, the display module 504 may generate the first synchronization signal 511 to correspond to the hardware synchronization signal (e.g., HW-VSYNC) generated from the inner part of the display driving circuit (e.g., the display driver IC 230 of FIG. 2) whenever information on one frame is completely output on the display panel (e.g., the display 210 of FIG. 2). According to an embodiment, as the display controller driver 502 receives the first synchronization signal 511 from the display module 504, the display controller driver 502 may determine that the display module 504 normally outputs a present frame (FRAME0; not illustrated), and may transmit, to the GRAM 503 and the display module 504, information on a first frame (FRAME1), which is a next frame. Although FIG. 5 illustrates that the GRAM 503 and the display module 504 are separate from each other for the illustrative purpose, the GRAM 503 may be included in the display module 504 according to an embodiment. The display module 504 may store information on the first frame FRAME1, which is received from the display controller driver 502, in the GRAM 503. The display module 504 may output the first frame FRAME1 information stored in the GRAM 503 to the display panel. A duration in which frame information is received from the display controller driver 502 and output to the display panel may be referred to as an address duration ADDR.

The display controller driver 502 may generate the second synchronization signal (e.g., SW-VSYNC) corresponding to the first synchronization signal 511, and transmit the signal to the graphics module 501, in response to the first synchronization signal 511 received from the display module 504. The graphics module 501 may render the second frame FRAME2, which is a next frame, in response to a second synchronization signal 512 received. The display controller driver 502 may receive information on the second frame FRAME2 from the graphics module 501. The display controller driver 502 may transmit information on the second frame FRAME2 to the GRAM 503 and the display module 504, based on the second synchronization signal 512. The display module 504 may output the second frame FRAME2 information stored in the GRAM 503 to the display panel.

The above operation may be iterated for the first duration 510. For the first duration 510, the first parameter is 120 Hz which is equal to the refresh rate of the display module 504, so the display module 504 may generate the first synchronization signal 511 whenever the address duration ADDR is terminated, without omitting the first synchronization signal 511. In addition, for the first duration 510, the second parameter is zero. Accordingly, the display module 504 may not increase or decrease the blank area. In addition, for the first duration 510, the third parameter is 120 Hz which is equal to the first parameter. Accordingly, the display controller driver 502 may generate the second synchronization signal 512 whenever receiving the first synchronization signal 511, without omitting the second synchronization signal 512.

According to an embodiment, although the target refresh rate of the display module 504 is changed to 30 Hz, the electronic device 101 may make a determination of changing only the third parameter to 30 Hz, based on the environment of ambient illuminance of the electronic device 101, on whether the electronic device 101 displays a still image, on the size of the display of the electronic device 101, on the type of a display panel included in the electronic device 101, on the interference state of the frequency of a peripheral device of the display panel, on the required reactivity, and/or on the current consumption. According to an embodiment, for a second duration 520, the target refresh rate may be 30 Hz, the first parameter may be 120 Hz, the second parameter may be 0, and the third parameter 30 Hz. According to an embodiment, the second duration 520 will be described below.

According to an embodiment, for the second duration 520, the first parameter may be 120 Hz and the third parameter may be 30 Hz, so the display controller driver 502 generates the second synchronization signal 512 with respect to one of every four first synchronization signals 511 received. In other words, the display controller driver 502 may generate one second synchronization signal 512 with respect to one of the four first synchronization signals 511, without generating the second synchronization signal 512 with respect to three first synchronization signals 511 of the four first synchronization signals 511. The graphics module 501 does not perform rendering for a next frame for a duration in which the second synchronization signal 512 is not formed. Accordingly, the display controller driver 502 may fail to receive information on a new frame. Accordingly, even if the display controller driver 502 receives the first synchronization signal 511, the display controller driver 502 may not transmit the information on the frame to the display module 504. The display module 504 may repeatedly output a fifth frame FRAME5 stored in the GRAM 503.

According to an embodiment, as the condition of the electronic device 101 is changed for a third duration 530, the electronic device may make a determination of increasing the second parameter, while considering low current consumption. According to an embodiment, the electronic device may increase the second parameter such that a frequency of the hardware synchronization signal (e.g., HW-VSYNC), which is generated whenever one frame is completely output, becomes 60 Hz. According to an embodiment, the electronic device may increase the waiting time VFP after outputting the vertical signal, such that the frequency of the hardware synchronization signal (e.g., HW-VSYNC) becomes 60 Hz. Hereinafter, the third duration 530 will be described below.

According to an embodiment, the display module 504 may increase the waiting time VFP after outputting the vertical signal, by the increment of the second parameter, after outputting an active video area when outputting the information on the frame. The duration of the waiting time VFP after outputting the vertical signal, which is increased by the display module 504, may be referred to a blank duration (VBLANK). After the blank duration (VBLANK) is terminated, the display controller driver 502 may generate the hardware synchronization signal. Accordingly, the period of the hardware synchronization signal is increased to be twice by the increment of the blank duration. Accordingly, the period of the first synchronization signal 511 generated based on the hardware synchronization signal may be increased to be twice. In other words, the number of times of generating the first synchronization signal 511 may be reduced in half of those the first duration 510 and the second duration 520.

According to an embodiment, as the condition of the electronic device 101 is changed for a fourth duration 540, the electronic device may make a determination of increasing the second parameter to correspond to 30 Hz, which is the target refresh rate, while considering current consumption. According to an embodiment, the electronic device may increase the second parameter, such that the frequency of the hardware synchronization signal (e.g., HW-VSYNC) becomes 30 Hz. According to an embodiment, the electronic device may increase the waiting time VFP after outputting the vertical signal, such that the frequency of the hardware synchronization signal (e.g., HW-VSYNC) becomes 30 Hz. Hereinafter, the fourth duration 540 will be described below.

According to an embodiment, the display module 504 may increase the waiting time VFP after outputting the vertical signal, by the increment of the second parameter, after outputting an active video area when outputting the information on the frame. Accordingly, the period of the hardware synchronization signal is increased to be four times by the increment of the blank duration. Accordingly, the period of the first synchronization signal 511 generated based on the hardware synchronization signal may be increased to be four times. In other words, the number of times of generating the first synchronization signal 511 may be reduced ¼ of those of the first duration 510 and the second duration 520.

According to an embodiment, when the electronic device changes the target refresh rate from 120 Hz to 30 Hz, the electronic device may first change the third parameter, which is a parameter for controlling the refresh rate through the software configuration, to correspond to the target refresh rate, based on the environment of the ambient illuminance of the electronic device, on whether the electronic device displays a still image, on the size of the display of the electronic device, on the type of a display panel included in the electronic device, on the interference state of the frequency of a peripheral device of the display panel, and/or on the required reactivity. As the above condition of the electronic device is changed, the electronic device may change the second parameter to correspond to the target refresh rate. Accordingly, the target refresh rate is implemented through the hardware configuration at the final stage, thereby reducing current consumption.

Hereinafter, the operation of the electronic device according to an embodiment will be described with reference to FIG. 6.

Figure 6:
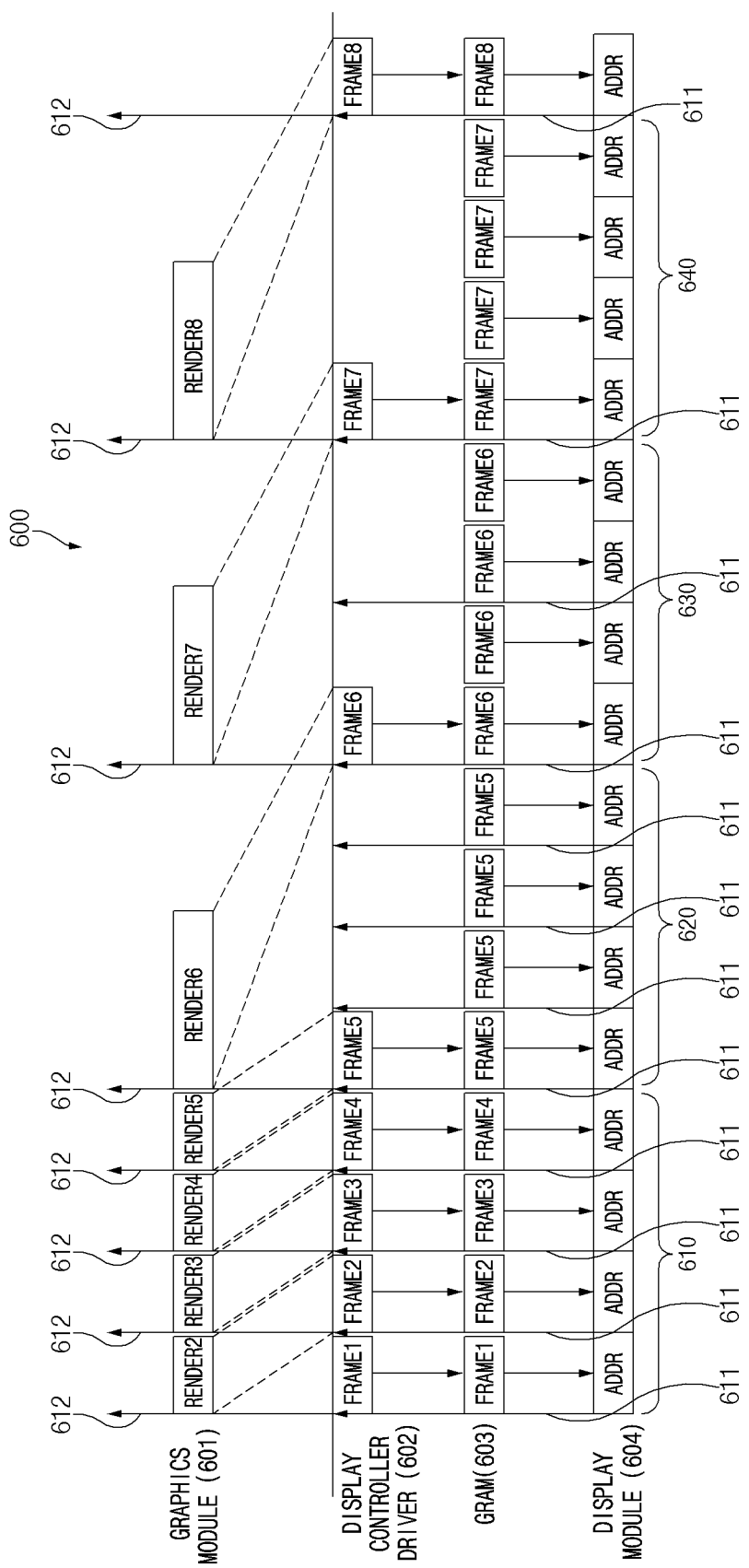
FIG. 6 is a view illustrating an operation of an electronic device, until the electronic device outputs a frame to a display, according to an embodiment.

FIG. 6 is a diagram 600 illustrating an operation of an electronic device, until the electronic device outputs a frame to a display, according to an embodiment.

Referring to FIG. 6, an electronic device (e.g., the electronic device 101 in FIG. 1) may include a graphics module 601, a display controller driver 602, a GRAM 603, and a display module 604.

According to an embodiment, for a first duration 610, the refresh rate of the display module 604 may be 120 HZ, the first parameter may be 120 Hz, the second parameter may be 0, and the third parameter 120 Hz. According to an embodiment, the description about the first duration 610 may be the same as the description about the first duration 510 of FIG. 5.

According to an embodiment, although the target refresh rate of the display module 604 is changed to 30 Hz, the electronic device may make a determination of changing only the third parameter to 30 Hz, based on the environment of the ambient illuminance of the electronic device, on whether the electronic device displays a still image, on the size of the display of the electronic device, on the type of a display panel included in the electronic device, on the interference state of the frequency of a peripheral device of the display panel, on the required reactivity, and/or the current consumption. According to an embodiment, for a second duration 620, the target refresh rate may be 30 HZ, the first parameter may be 120 Hz, the second parameter may be 0, and the third parameter 30 Hz. According to an embodiment, the description about the second duration 620 may be the same as the description about the second duration 520 of FIG. 5.

According to an embodiment, as the condition of the electronic device is changed for a third duration 630, the electronic device may make a determination of increasing the first parameter to 60 Hz, while considering current consumption. According to an embodiment, for the third duration 630, the refresh rate of the display module 604 is 120 Hz, and the first parameter is 60 Hz. Accordingly, the display module 604 may generate a first synchronization signal (e.g., TE-VSYNC) 611 only with respect to one of every two hardware synchronization signal (e.g., HW-VSYNC) generated by the display driving circuit. In other words, the display module 604 may generate a first synchronization signal 611 with respect to one hardware synchronization signal of two hardware synchronization signals, without generating the first synchronization signal 611 with respect to remaining one of the two hardware synchronization signals. For the duration in which the first synchronization signal 611 is not formed, even the second synchronization signal (e.g., SW-VSYNC) 612 is not formed. Accordingly, the graphics module 601 may not perform the rendering for the next frame. Accordingly, the display controller driver 602 fails to receive information on a new frame, and the display module 504 may repeatedly output a sixth frame FRAME6 stored in the GRAM 603.

According to an embodiment, as the condition of the electronic device 101 is changed for a fourth duration 640, the electronic device may make a determination of changing the first parameter to 30 Hz, while considering current consumption. According to an embodiment, for the fourth duration 640, the refresh rate of the display module 604 is 120 Hz, and the first parameter is 30 Hz. The display module 504 may generate the first synchronization signal 611 with respect to one of every four hardware synchronization signals generated by the display driving circuit. In other words, the display module 604 may generate the first synchronization signal 611 with respect to one of four hardware synchronization signals, without generating the first synchronization signal 611 with respect to remaining three of the four hardware synchronization signals. For the duration in which the first synchronization signal 611 is not formed, even a second synchronization signal 612 is not formed. Accordingly, the graphics module 601 may not perform the rendering for the next frame. Accordingly, the display controller driver 602 fails to receive information on a new frame, and the display module 604 may repeatedly output a seventh frame FRAME7 stored in the GRAM 603.

According to an embodiment, when the electronic device changes the target refresh rate from 120 Hz to 30 Hz, the electronic device may first change the third parameter, which is a parameter for controlling the refresh rate through the software configuration, to correspond to the target refresh rate, based on the environment of the ambient illuminance of the electronic device, on whether the electronic device displays a still image, on the size of the display of the electronic device, on the type of a display panel included in the electronic device, on the interference state of the frequency of a peripheral device of the display panel, and/or on the required reactivity. As the above condition of the electronic device is changed, the electronic device may change the first parameter to correspond to the target refresh rate. Accordingly, the target refresh rate is implemented through the hardware configuration at the final stage, thereby reducing current consumption.

Hereinafter, the operation of the electronic device according to an embodiment will be described with reference to FIGS. 7 and 8.

Figure 7:
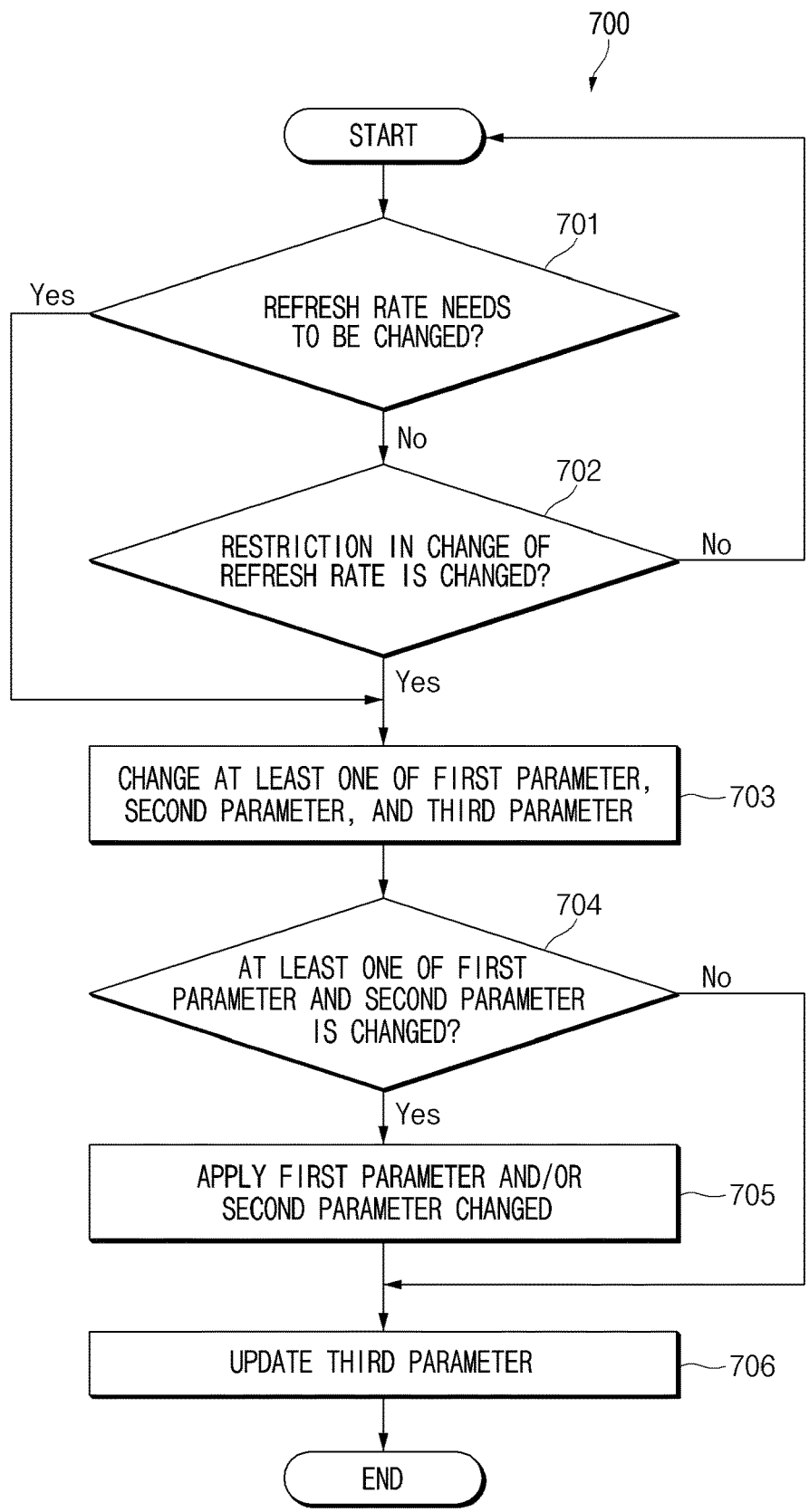
FIG. 7 is a flowchart illustrating an operation of an electronic device, according to an embodiment.

FIG. 7 is a flowchart 700 illustrating the operation of an electronic device, according to an embodiment. FIG. 8 is a flowchart 800 illustrating the operation of an electronic device, according to an embodiment. According to an embodiment, the same components as those of the above described embodiment will be assigned with the same reference numerals, and the duplication thereof will be omitted. According to an embodiment, the operation of the electronic device (e.g., the electronic device 101 of FIG. 1) may be performed by a processor (e.g., the processor 120 of FIG. 1) of the electronic device.

Referring to FIG. 7, in operation 701, according to an embodiment, an electronic device may determine whether the refresh rate needs to be changed. According to an embodiment, the electronic device may determine that the refresh rate needs to be changed, when an application of the electronic device is executed. According to an embodiment, when the switching between a still image and a moving picture is made, when a user input is made or is not made for a specific time interval, or when a screen to be displayed on the display is changed, the electronic device may determine that the refresh rate needs to be changed.

According to an embodiment, as the electronic device determines that the refresh rate does not need to be changed, the electronic device may determine whether the restriction in the change of the refresh rate is changed in operation 702. The restriction in the change of the refresh rate refers to the restriction in which the refresh rate is prevented from being changed. For example, when the environment of the ambient illuminance is equal to or less than 40 lux, the change of the refresh rate may be restricted. When the restriction in the change of the refresh rate is changed, the restriction in the change of the refresh rate may be present and then disappeared, or the restriction in the change of the refresh rate may be absent and then made. For example, when the environment of the ambient illuminance is changed from 40 lux or less to more than 40 lux, the electronic device may identify the restriction in the change of the refresh rate as being changed.

According to an embodiment, when the refresh rate needs to be changed, or when the restriction in the change of the refresh rate is changed, the electronic device may determine the target refresh rate. In operation 703, the electronic device may change at least one of the first parameter, the second parameter, or the third parameter to change the refresh rate of the electronic device to the target refresh rate.

According to an embodiment, in operation 703, the electronic device may consider the condition of the electronic device for a parameter to be changed and a change degree of the parameter, when changing the at least one of the first parameter, the second parameter, or the third parameter to change the refresh rate of the electronic device to the target refresh rate.

According to an embodiment, the condition which is to be considered for a parameter to be changed and a change degree of the parameter, when the electronic device changes the at least one of the first parameter, the second parameter, or the third parameter may include the environment of the ambient illuminance of the electronic device, whether the electronic device displays a still image, the size of the display of the electronic device, the type of a display panel included in the electronic device, the interference state of the frequency of a peripheral device of the display panel, on the required reactivity, and/or the current consumption.

The following description will be made regarding the condition considered when the electronic device determines a parameter, which is to be changed, of the first parameter, the second parameter, or the third parameter and a change degree of the parameter, according to an embodiment. Hereinafter, implementing the target refresh rate through the first parameter and/or the second parameter may be referred to as a hardware (H/W) modulation, and implementing the target refresh rate through the third parameter may be referred to as a software (S/W) modulation.

According to an embodiment, the electronic device may consider the environment of the ambient illuminance of the electronic device. For example, when the electronic device is present under the environment of the lower illuminance, and when the color or the brightness of the display screen of the display is changed, the visibility by a user eye is increased more, when compared to the environment of the higher illuminance. Accordingly, when the refresh rate of the electronic device is changed under the environment of the lower illuminance, the change of the refresh rate is more viewed, when compared to the environment of the higher illuminance. Accordingly, as the illuminance is lowered, the refresh rate needs to be changed more seamlessly. The following Table 2 shows a criterion of selecting a hardware (H/W) modulation and a software (S/W) modulation.

TABLE 2

| Illuminance | Visibility degree for change of refresh rate | Range for changing Hardware modulation seamlessly | Selected modulation | Range for changing frequency is illustrated |
|---|---|---|---|---|
| 40 Lux or less | High | Narrow range | S/W | S/W: 120 to 1 Hz<br>H/W: 120 Hz |
| More than 40 lux to less than 7400 lux | Low | Wide range (e.g., 120 Hz to 48 Hz) | S/W and H/W | S/W: 120 to 1 Hz<br>H/W: 120 to 48 Hz |
| 7400 lux or more | Hardly shown | Wider range (e.g., 120 Hz to 1 Hz) | H/W | S/W: 120 to 1 Hz<br>H/W: 120 to 1 Hz |

In Table 2, "high", "low", "narrow", and "wide" may be values relative to each other. Referring to Table 2, as the change of the refresh rate is more viewed under the environment of the lower illuminance of 40 lux or less, the electronic device may select the software modulation. As described with reference to Table 1, when the target refresh rate is implemented in hardware configuration (that is, when the hardware modulation is employed), the change of the refresh rate is more viewed. Accordingly, a range for changing the refresh rate through the hardware modulation seamlessly without being viewed by a user may be significantly narrowed under the environment of the lower illuminance of 40 lux or less. In other words, even if the hardware modulation is slightly changed under the environment of the lower illuminance of 40 lux or less, the change of the refresh rate is greatly viewed. Accordingly, when the target refresh rate is changed under the environment of the lower illuminance of 40 lux or less, the electronic device may select the software modulation. According to an embodiment, when the target refresh rate is changed under the environment of the lower illuminance of 40 lux or less, the hardware modulation may be fixed to 120 Hz, and the software modulation may be changed in the range of 120 Hz to 1 Hz.

Referring to Table 2, as the visibility for the change of the refresh rate is lower under the environment of the illuminance in the range of more than 40 lux to less than 7400 lux, the electronic device may select the combination of the software modulation and the hardware modulation. As described with reference to Table 1, although the target refresh rate implemented in hardware configuration (that is, when the hardware modulation is used) shows the higher visibility for the change of the refresh rate, the visibility for the change of the refresh rate is lowered under the environment of the illuminance in the range of more than 40 lux to less than 7400 lux. The range of changing the hardware modulation seamlessly is widened (e.g., 120 Hz to 40 Hz). Accordingly, when the target refresh rate is changed under the environment of the illuminance in the range of more than 40 lux to less than 7400 lux, the electronic device may select the combination of the software modulation and the hardware modulation. According to an embodiment, when the target refresh rate is changed under the environment of the illuminance in the range of more than 40 lux to less than 7400 lux, the electronic device may change the hardware modulation in the range of 120 Hz to 48 Hz, and may change the software modulation in the range of 120 Hz to 1 Hz.

Referring to Table 2, the visibility for the change of the refresh rate is hardly shown under the environment of the illuminance of 7400 lux or more. Accordingly, the electronic device may select the hardware modulation. As described above with reference to Table 1, the target refresh rate implemented in hardware configuration (that is, when the hardware modulation is used) shows the higher visibility for the change of the refresh rate, but makes the current consumption lower. In other words, the lower visibility for the change of the refresh rate is shown under the environment of the illuminance of 7400 lux or more. Accordingly, under the environment of the illuminance of 7400 lux or more, the range for changing the hardware modulation is widest (e.g., 120 Hz to 1 Hz). Accordingly, when the electronic device changes the target refresh rate under the environment of the illuminance of 7400 lux or more, the electronic device may select the hardware modulation to reduce the current consumption. According to an embodiment, when the target refresh rate is changed under the environment of the illuminance in the range of 7400 lux or more, the electronic device may change the hardware modulation in the range of 120 Hz to 1 Hz, and may change the software modulation in the range of 120 Hz to 1 Hz.

When only the scheme of changing the hardware modulation is employed, the change of the refresh rate may be restricted due to the visibility for the change of the refresh rate under the environment of the lower illuminance. However, according to various embodiments of the disclosure, as the scheme of changing the software modulation is used, even when a problem is caused with the visibility for the change of the refresh rate, the frequency for generating the second synchronization signal (e.g., SW-VSYNC) affecting the rendering period of the graphics module may be lowered. Accordingly, the current consumption may be reduced.

According to an embodiment, when determining whether to select the software modulation or the hardware modulation, the electronic device may consider whether the still image is displayed or the moving picture is displayed. For example, although the change of the refresh rate is hardly viewed when the electronic device displays the moving picture, the change of the refresh rate may be more easily viewed when the still image is displayed. The following Table 3 shows a criterion of selecting a hardware (HAV) modulation and a software (S/W) modulation depending on the screen displayed by the electronic device.

TABLE 3

| Screen | Visibility degree for the change of refresh rate | Range for changing Hardware modulation seamlessly | Selected modulation | Range for changing frequency is illustrated |
|---|---|---|---|---|
| Still image | High | Narrow range | S/W | S/W: 120 to 1 Hz<br>H/W: 120 Hz |
| Moving picture | Hardly shown | Wider range (e.g., 120 Hz to 48 Hz) | H/W | S/W: 120 to 1 Hz<br>H/W: 120 to 48 Hz |

In Table 3, "high", "low", "narrow", and "wide" may be values relative to each other. Referring to Table 3, when the electronic device displays the still image, as the change of the refresh rate is more viewed, the electronic device may select the software modulation. When the electronic device displays the still image, the range for changing the hardware modulation seamlessly without the recognition of the user may be significantly narrowed. In other words, when the electronic device displays the still image, the change of the refresh rate may be greatly viewed even if the hardware modulation is slightly changed. Accordingly, when displaying the still image and changing the target refresh rate, the electronic device may select the software modulation. According to an embodiment, when the electronic device displays the still image, and changes the target refresh rate, the hardware modulation may be fixed to 120 Hz, and the software modulation may be changed in the range of 120 Hz to 1 Hz.

Referring to Table 3, when the electronic device displays the moving picture, as the change of the refresh rate is hardly viewed, the electronic device may select the hardware modulation. When the electronic device displays the moving picture, as the change of the refresh rate is hardly viewed, the range for changing the hardware modulation seamlessly is wider (e.g., 120 Hz to 48 Hz). Accordingly, when the electronic device displays the moving picture, and when the target refresh rate is changed, the electronic device may select the hardware modulation by considering the benefit in terms of the current consumption. According to an embodiment, when the electronic device displays the moving picture, and when the target refresh rate is changed, the electronic device may change the hardware modulation in the range of 120 Hz to 48 Hz, and may change the refresh rate through the software modulation in the range of 120 Hz to 1 Hz.

In other words, the electronic device solves the problem with the visibility for the change of the refresh rate at two stages. In detail, when the electronic device displays the still image, the frequency is changed through the software modulation. Thereafter, when the visibility for the change of the refresh rate is lower as the screen is changed or the brightness is changed, the frequency is changed through the Hardware modulation, thereby reducing the current consumption.

In addition, according to an embodiment, the electronic device may consider the size of the display screen of the electronic device to determine whether to select the software modulation or to select the hardware modulation. For example, as the screen of the electronic device becomes smaller, the change of the refresh rate may be more easily viewed. The following Table 4 shows a criterion of selecting a hardware (H/W) modulation and a software (S/W) modulation depending on the size of the screen displayed by the electronic device.

TABLE 4

| Screen size | Visibility degree for changing refresh rate | Range for changing hardware modulation seamlessly | Selected modulation | Range for changing frequency is illustrated |
|---|---|---|---|---|
| Larger screen (e.g., 7 inch or more) | High | Narrow range (e.g., 120 Hz to 96 Hz) | S/W | S/W: 120 to 1 Hz<br>H/W: 120~96 Hz |
| Smaller screen (e.g., 7 inch or less) | Lower | Wide range (e.g., 120 Hz to 48 Hz) | S/W and H/W | S/W: 120 to 1 Hz<br>H/W: 120 to 48 Hz |

In Table 4, "large", "small", "high", "low" ~, "narrow", or "wide" may be values relative to each other. Referring to Table 4, when the electronic device corresponds to a tablet PC or a laptop computer and has a larger display screen size (e.g., 7 inch or more), as the change of the refresh rate is more viewed, the electronic device may select the software modulation. When the electronic device has the larger display screen size, the range for changing the hardware modulation seamlessly is relatively narrow (e.g., 120 Hz to 96 Hz) without the recognition of the user. Accordingly, when the electronic device has the larger display screen size, and changes the target refresh rate, the electronic device may select the software modulation. According to an embodiment, when the electronic device has the larger display screen size, and changes the target refresh rate, the hardware modulation may be changed in the range of 120 Hz to 96 Hz, and the software modulation may be changed in the range of 120 Hz to 1 Hz.

Referring to Table 4, when the electronic device is a smartphone, or when the electronic device has a smaller display screen size (e.g., 7 inch or less), as the visibility for the change of the refresh rate is lower, the electronic device may select the combination of the software modulation and the hardware modulation. When the electronic device has a smaller display screen size, as the visibility for the change of the refresh rate is lower, the range for changing the hardware modulation seamlessly is wider (e.g., 120 Hz to 48 Hz). Accordingly, when the electronic device has the smaller display screen size, and when the target refresh rate is changed, the electronic device may select the combination of the software modulation and the hardware modulation by considering the reduction of the current consumption. According to an embodiment, when the electronic device has the smaller display screen size, and when the target refresh rate is changed, the electronic device may change the hardware modulation in the range of 120 Hz to 48 Hz, and may change the software modulation in the range of 120 Hz to 1 Hz.

In addition, according to an embodiment, when the electronic device includes a rollable display or a foldable display, and when the screen size of the display is changed, the electronic device may control the software modulation and the hardware modulation depending on the change in the screen size of the display.

In addition, according to an embodiment, the electronic device may consider the characteristic of the leakage current of the display panel of the electronic device to determine whether to select the software modulation or to select the hardware modulation. According to an embodiment, the characteristic of the leakage current of the display panel of the electronic device may be classified depending on the type of the thin film transistor included in the display panel. For example, a display panel based on a low temperature polycrystalline silicon (LTPS) thin film transistor may have a larger amount of leakage current, and a display panel based on a thin film transistor (e.g., hybrid oxide and polycrystalline silicon (HOP) and a low temperature polyscrystalline oxide (LTPO)) formed by bonding an LTPS and an oxide may have a smaller amount of leakage current. The following Table 5 shows a criterion of selecting a hardware (H/W) modulation and a software (S/W) modulation depending on the leakage current characteristic of the display panel of the electronic device.

TABLE 5

| Characteristic of leakage current | Visibility degree for changing refresh rate | Range for changing hardware modulation seamlessly | Selected modulation | Range for changing frequency illustrated |
|---|---|---|---|---|
| Larger amount of leakage current | High | Narrow range | S/W | S/W: 120 to 1 Hz<br>H/W: 120 to 96 Hz |
| Smaller amount of leakage current | Lower | Wide range (e.g., 120 Hz to 48 Hz) | S/W and H/W | S/W: 120 to 1 Hz<br>H/W: 120 to 48 Hz |

In Table 5, "large", "small", "high", "low", "narrow", or "wide" may be values relative to each other. Referring to Table 5, when the display panel of the electronic device has a larger amount of leakage current, a flicker phenomenon is more frequently caused, so the change of the refresh rate is more viewed. Accordingly, the electronic device may select the software modulation. When the display panel of the electronic device has the larger amount of leakage current, the range for changing the hardware modulation seamlessly without recognition of the user may be relatively narrowed. Accordingly, when the display panel of the electronic device has the larger amount of leakage current, and when the electronic device changes the target refresh rate, the electronic device may select the software modulation. According to an embodiment, when the display panel of the electronic device has the larger amount of leakage current, and when the target refresh rate is changed, the hardware modulation may be changed in the range of 120 Hz to 96 Hz, and the software modulation may be changed in the range of 120 Hz to 1 Hz.

Referring to Table 5, when the display panel of the electronic device has a smaller amount of leakage current, a flicker phenomenon is less frequently caused, so the change of the refresh rate is less viewed. Accordingly, the electronic device may select the combination of the software modulation and the hardware modulation. When the display panel of the electronic device has a smaller amount of leakage current, as the visibility for the change of the refresh rate is lower, the range for changing the hardware modulation seamlessly is wider (e.g., 120 Hz to 48 Hz). Accordingly, when the display panel of the electronic device has a smaller amount of leakage current, and when the target refresh rate is changed, the electronic device may select the combination of the software modulation and the hardware modulation by considering the reduce of the current consumption. According to an embodiment, when the display panel of the electronic device has the smaller amount of leakage current, and when the target refresh rate is changed, the hardware modulation may be changed in the range of 120 Hz to 48 Hz, and the software modulation may be changed in the range of 120 Hz to 1 Hz.

In addition, according to an embodiment, the electronic device may consider the interference with a touch circuit, which is a peripheral device of a display module (e.g., the display module 160 of FIG. 2) to determine whether to select the software modulation or select the hardware modulation. For example, when a duration in which the display module autonomously outputs a frame is increased, instead of receiving information on the frame from the display controller driver by increasing the first parameter and/or the second parameter, the potential difference in a specific level or more may be made in a capacitor of a touch sensor (e.g., the touch sensor 251 of FIG. 2), and a ghost touch phenomenon of recognizing a touch input that does not actually exist, may be caused. Accordingly, when the user is making a touch, the hardware modulation (that is, the change of the first parameter and/or the second parameter) needs to be restricted to prevent the ghost touch phenomenon. The following description will be made with reference to FIG. 8.

Figure 8:
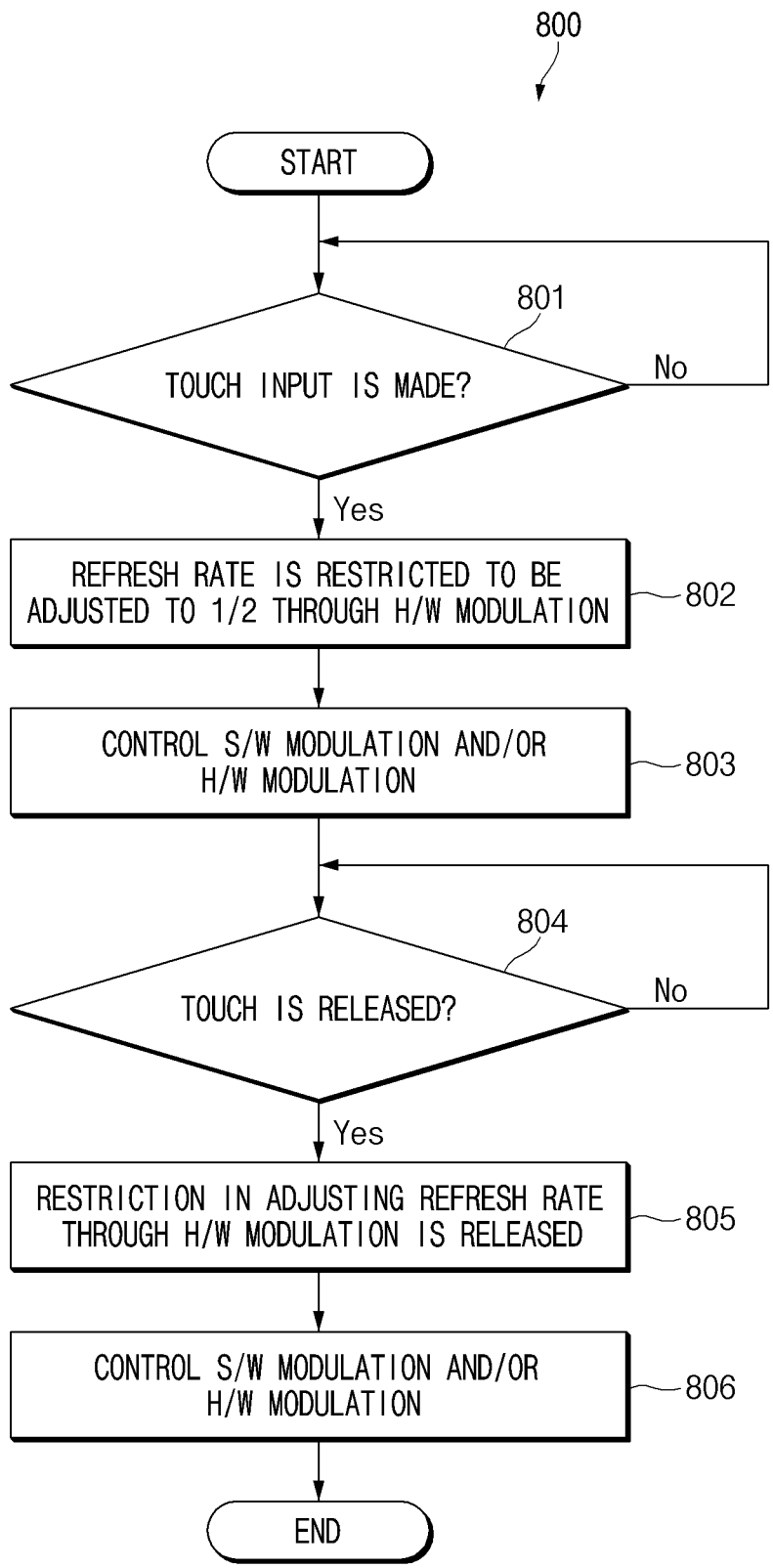
FIG. 8 is a flowchart illustrating an operation of an electronic device, according to an embodiment.

Referring to FIG. 8, in operation 801, the electronic device may identify whether a touch input of the user is made.

In operation 802, as the electronic device identifies that the touch input of the user is generated, adjusting the refresh rate through the hardware modulation is restricted such that the refresh rate is adjusted to ½ of a present refresh rate. For example, when the present refresh rate is 120 Hz and the target refresh rate is 30 Hz, and when the touch input is made, the adjusting of the refresh rate through the hardware modulation is restricted such that the refresh rate is adjusted to 60 Hz which is ½ of 120 Hz. Although FIG. 8 illustrates that the adjusting of the refresh rate through the hardware modulation is restricted such that the refresh rate is adjusted to ½ of a present refresh rate, which is provided only for the illustrative purpose, the adjusting of the refresh rate through the hardware modulation is restricted such that the refresh rate is adjusted to 1/N of the present refresh rate, depending on the designs of a touch circuit included in the electronic device. N may be an integer value which is predetermined based on the designs of the touch circuit.

In operation 803, as the adjusting of the refresh rate through the hardware modulation is restricted, the electronic device may control the hardware modulation and/or the software modulation to implement the target refresh rate. For example, when the present refresh rate is 120 Hz and target refresh rate is 30 Hz, the adjusting of the refresh rate through the hardware modulation is restricted such that the refresh rate is adjusted to 60 Hz. Accordingly, the software modulation may change the refresh rate to 30 Hz. In this case, whether to adjust the refresh rate to 60 Hz through the hardware modulation may be determined based on the above-described illuminance environment, a display screen size, a screen display content, and/or a leakage current characteristic.

In operation 804, the electronic device may determine whether the touch is released. According to an embodiment, when the touch is not released, a present state may be maintained.

In operation 805, as the touch is determined as being released, the electronic device may release a frequency adjustment restriction through the hardware modulation.

In operation 806, the electronic device may control the hardware modulation and/or software modulation to implement the target refresh rate, as the restriction in adjusting of the refresh rate through the hardware modulation is released. For example, when the target refresh rate is 30 Hz, the software modulation corresponds to 30 Hz, and the hardware modulation corresponds 60 Hz, the refresh rate to be adjusted through the hardware modulation may be changed 30 Hz, as the restriction in adjusting of the refresh rate through the hardware modulation is released.

In addition, according to an embodiment, the electronic device may consider interference with the wireless communication module (e.g., the wireless communication module 192 of FIG. 1) which is a peripheral device of the display module (e.g., the display module 160 of FIG. 1) to determine whether to select the software modulation or the hardware modulation. For example when it is difficult to change the hardware modulation due to the noise of the radio frequency of the wireless communication module, the frequency interference may be avoided by changing the software modulation. The following Table 6 shows a criterion of selecting a hardware (H/W) modulation and a software (S/W) modulation depending on the interference state of the radio frequency.

TABLE 6

| Interference state of radio frequency | Selected modulation |
| --- | --- |
| Interference caused | S/W and the combination of S/W and H/W |
| Interference not caused | H/W |

In addition, according to an embodiment, the electronic device may consider the reactivity required to determine whether to select the software modulation or to select the hardware modulation. For example, when the hardware modulation is changed and when a next first synchronization signal (e.g., TE-VSYNC) is formed, a changed value is applied. However, when the software modulation is changed, the changed value is immediately applied such that the rapid reactivity is obtained. Accordingly, when higher reactivity is required, the software modulation is first applied. In the following Table 7, the difference in reactivity between the hardware

TABLE 7

| Modulation method | Software modulation frequency | Hardware modulation frequency | Reactivity | Current consumption | Reaction rate when refresh rate is changed in response to touch input |
| --- | --- | --- | --- | --- | --- |
| Hardware modulation | 30 Hz | 30 Hz | Slow | Low | 66.7 msec to 100 msec |
| Software modulation and Hardware modulation | 30 Hz | 60 Hz | Intermediate | Intermediate | 33.3 msec to 50 msec |
| Software modulation | 30 Hz | 120 Hz | Fast | Slightly higher | 16.7 msec to 25 msec |

In Table 7, "high", "low", "slow", and "fast" may be values relative to each other. Referring to Table 7, when the present refresh rate is 120 Hz, the target refresh rate is 30 Hz, the frequency of the hardware modulation is immediately changed to 30 Hz, lower current consumption may be shown and the slowest reactivity may be made. According to an embodiment, when the frequency of the hardware modulation is changed to 30 Hz in response to the touch input of the user, the reactivity speed may be in the range of 66.7 msec to 100 msec.

Referring to Table 7, when the present refresh rate is 120 Hz, the target refresh rate is 30 Hz, the frequency of the hardware modulation is changed to 60 Hz, and the frequency of the software modulation is changed to 30 Hz, intermediate current consumption may be shown and the intermediate reactivity may be made. According to an embodiment, the frequency of the hardware modulation is changed to 60 Hz and the frequency of the software modulation is changed to 30 Hz, in response to the touch input of the user, the reaction rate may be in the range of 33.3 msec to 50 msec.

Referring to Table 7, on the assumption that the present refresh rate is 120 Hz, and when the target refresh rate is 30 Hz, when the frequency of the software modulation is changed to 30 Hz, slightly higher current consumption may be shown and the fastest reactivity may be made. According to an embodiment, when the frequency of the software modulation is changed to 30 Hz in response to the touch input of the user, the reaction rate may be in the range of 16.7 msec to 25 msec.

Accordingly, the electronic device may select the software modulation and the hardware modulation depending on the required reactivity degree.

In addition, according to an embodiment, the electronic device may operate a component, such as a touch sensor circuit (e.g., the touch sensor IC 253 of FIG. 2) of the electronic device and/or a display driving circuit (e.g., the display driver IC 230 of FIG. 2), which requires higher reactivity, in synchronization with the frequency of the hardware modulation, and may operate a component, such as a graphic processing unit (GPU), which reduces the current consumption, in synchronization with the frequency of the software modulation to reduce a rendering speed, thereby comprising the higher reactivity and lower-power operation.

Referring back to FIG. 7, when the electronic device changes at least one of the first parameter, the second parameter, and the third parameter to change the refresh rate of the electronic device to the target refresh rate, the electronic device may determine whether at least one of the first parameter and the second parameter is changed, in operation 704.

When the at least one of the first parameter and the second parameter is changed, the electronic device may employ the changed first parameter and/or the changed second parameter in operation 705. According to an embodiment, as the display controller driver transmits the information on the changed first parameter and/or the information on the changed second parameter to the display driving circuit, the electronic device may employ the changed first parameter and/or the changed second parameter.

When at least one of the first parameter and the second parameter is not changed, or when the changed first parameter and/or the changed second parameter is employed, the electronic device may update the third parameter in operation 706. According to an embodiment, the display controller driver may update the frequency of the second synchronization signal (e.g., SW-VSYNC), based on the information on the third parameter.

Hereinafter, the effect of the electronic device according to an embodiment will be described with reference to FIG. 9.

Figure 9:
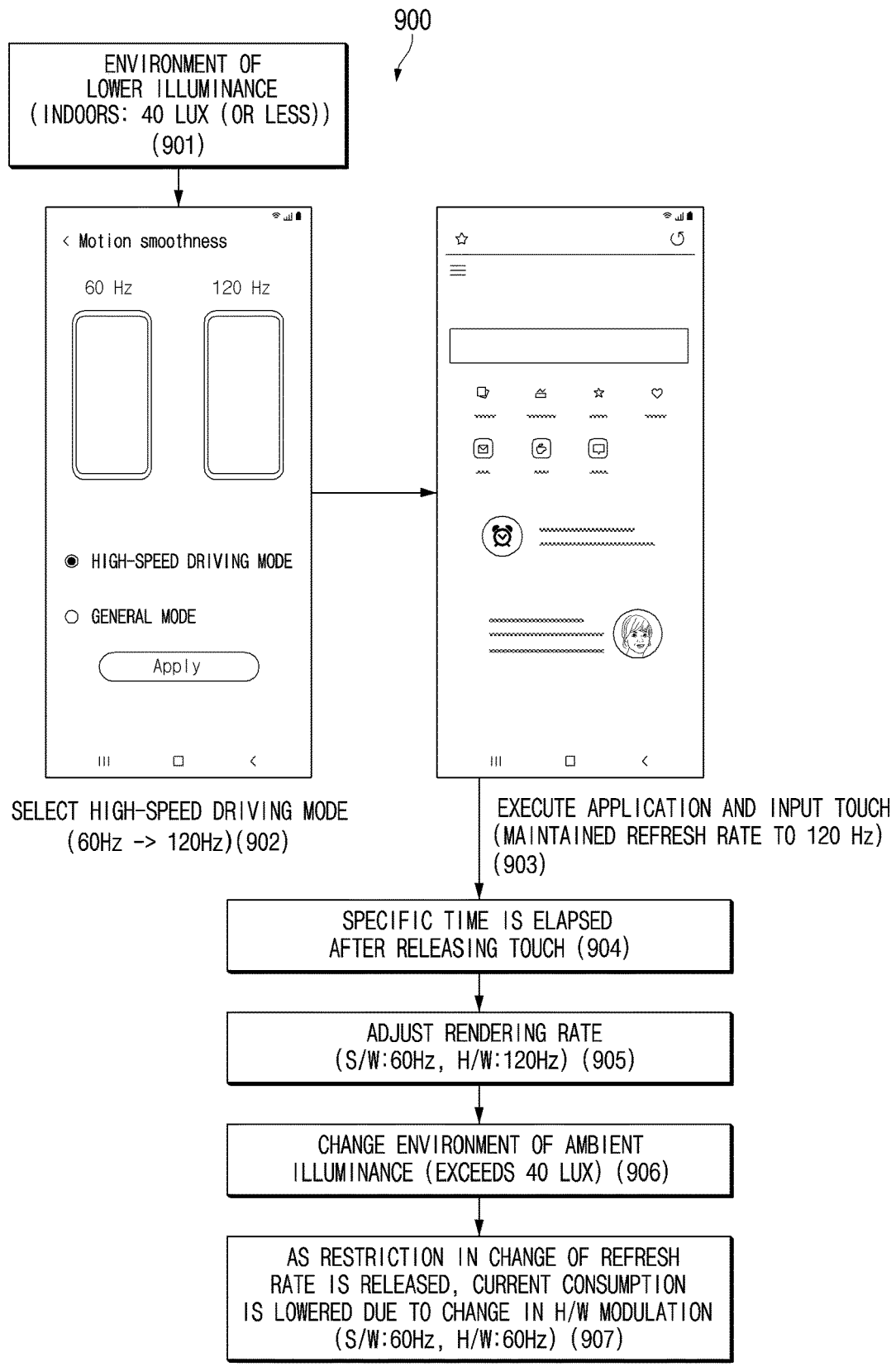
FIG. 9 is a view illustrating an example in which an electronic device is applied, according to an embodiment.

FIG. 9 is a view 900 illustrating an example in which an electronic device is applied, according to an embodiment. According to an embodiment, the same components as those of the above described embodiment will be assigned with the same reference numerals, and the duplication thereof will be omitted.

Referring to FIG. 9, an electronic device (e.g., the electronic device 101 of FIG. 1) may be positioned under the environment of lower illuminance (e.g., the interior environment having the illuminance of 40 lux or less) (901).

According to an embodiment, the electronic device may provide a user interface to select a higher-speed driving mode and a normal mode. According to an embodiment, the higher-speed driving mode is to automatically adjust the refresh rate to 120 Hz such that animation and a scroll operation may be more smoothly provided. According to an embodiment, the normal mode may be to a mode to reduce the power consumption of the battery while maintaining the refresh rate to 60 Hz.

According to an embodiment, the electronic device may select the higher-speed driving mode in the normal mode in which the present refresh rate is 60 Hz (902). The electronic device may increase the refresh rate to 120 Hz, as the higher-speed driving mode is selected.

According to an embodiment, the electronic device may identify an application executed by a user and a touch input (903). The electronic device may maintain the refresh rate to 120 Hz, as the application executed by the user and the touch input are identified.

According to an embodiment, the electronic device may identify that a specific time is elapsed after the touch is released (904). The electronic device may change the target refresh rate to 60 Hz to lower the refresh rate to 60 Hz from 120 Hz, as the electronic device identifies that the specific time is elapsed after the touch is released.

According to an embodiment, the electronic device may determine the frequency of the hardware modulation as being maintained, and the frequency of the software modulation as being changed, in response to recognizing the electronic device under the environment of lower illuminance. As the electronic device may determine the frequency of the hardware modulation as being maintained, and the frequency of the software modulation as being changed, the electronic device may adjust the rendering speed by reducing the frequency of the software modulation to 60 Hz, and may maintain the frequency of the hardware modulation to 120 Hz (905).

According to an embodiment, the electronic device may recognize that the environment of the ambient illuminance of the electronic device exceeds 40 lux (906).

According to an embodiment, as the environment of the ambient illuminance of the electronic device is changed to exceed 40 lux, the restriction in the change of the refresh rate is released. Accordingly, the electronic device may determine the hardware modulation to be changed. The electronic device may reduce the current consumption, as the frequency of the hardware modulation is reduced to 60 Hz (907).

In other words, according to an electronic device of an embodiment of the disclosure, as the software modulation is changed under the environment of the lower illuminance, the rendering speed may be reduced seamlessly. When moving to the environment of the higher illuminance, the electronic device automatically changes the hardware modulation to reduce the current consumption.

In addition, according to an embodiment, the target refresh rate of the electronic device is reduced and then increased again. According to an embodiment, on the assumption that the target refresh rate is determined to 24 Hz, and the frequency of the software modulation is changed to 24 Hz as the moving picture is reproduced under the situation in which the refresh rate of the electronic device is 120 Hz, when a new message is updated in a message application, so the target refresh rate is changed to 120 Hz. In this case, since only the frequency of the software modulation is changed, the frequency of the software modulation may be immediately changed to 120 Hz with a small delay. According to an embodiment, when the frequency of the hardware modulation is changed from 24 Hz to 120 Hz, the delay may be made up to 41.7 msec. When the frequency of the software modulation is changed from 24 Hz to 120 Hz, the refresh rate may be changed within 8.3 msec.

According to the electronic device of an embodiment of the disclosure, the current consumption may be reduced by changing the rendering rate seamlessly under the condition in which it is difficult to change the refresh rate seamlessly.

According to the electronic device of an embodiment of the disclosure, the refresh rate may be changed while increasing the efficiency in terms of the seamless change of the refresh rate, the reactivity, the interference of the peripheral device, and the current consumption through the combination of software modulation and hardware modulation.

What is claimed is:

1. An electronic device comprising:
   a display device including a display driving circuit;
   a processor operatively connected to the display device; and
   a memory operatively connected to the processor, wherein the memory stores at least one instruction which, when executed, causes the processor to:
      identify whether at least one of a request for changing a refresh rate and a change of restriction in changing the refresh rate is made;
      change at least one of a first parameter, a second parameter, and a third parameter, in response to identifying that the at least one of the request for the change of the refresh rate and the change of restriction in the change of the refresh rate is made; and
      apply a changed parameter of the first parameter, the second parameter, and the third parameter,
   wherein the first parameter is a frequency of a first synchronization signal formed in the display driving circuit,
   wherein the second parameter is an increment or a decrement of a blank area in frame information to substitute for a portion of an active video area, and
   wherein the third parameter is a frequency of a second synchronization signal for rendering.

2. The electronic device of claim 1, wherein the at least one instruction further causes the processor to:
   change the third parameter when the electronic device is under a visibility condition increasing a visibility of the change of the refresh rate.

3. The electronic device of claim 2, wherein the visibility condition includes at least one of:
   the electronic device being within an environment having lower illuminance of a predetermined threshold value or less;
   the display device displaying a still image;
   a screen size of the display device being greater than or equal to a predetermined threshold size; and
   a leakage current of the display device being equal to or greater than a predetermined threshold current.

4. The electronic device of claim 3, wherein the at least one instruction causes the processor to:

change the first parameter, the second parameter, or both the first parameter and the second parameter when the visibility condition is absent.

5. The electronic device of claim 1, further comprising:
an illuminance sensor,
wherein the at least one instruction further causes the processor to:
change the third parameter to a target refresh rate when an illuminance value identified using the illuminance sensor is equal to or less than a predetermined threshold value; and
change the first parameter or the second parameter to the target refresh rate when the illuminance value is changed to be greater than the predetermined threshold value.

6. The electronic device of claim 1, wherein the at least one instruction further causes the processor to:
restrict the change of the first parameter and the second parameter when a touch input of a user is identified.

7. The electronic device of claim 1, further comprising:
a touch circuit,
wherein the at least one instruction further causes the processor to:
restrict a range for the change of the first parameter and the second parameter to 1/N of a present refresh rate, for an integer value N predetermined for the touch circuit, while a touch input of a user is identified by the touch circuit.

8. The electronic device of claim 1, wherein the at least one instruction further causes the processor to:
change the third parameter when the electronic device requires a faster reaction rate.

9. The electronic device of claim 1, wherein the at least one instruction further causes the processor to:
control the display driving circuit to form the first synchronization signal based on the first parameter and to transmit the first synchronization signal to a display controller driver; and
control the display controller driver to form the second synchronization signal based on the third parameter and to transmit the second synchronization signal to a graphics module.

10. The electronic device of claim 1, wherein the at least one instruction further causes the processor to:
signal a display controller driver to control the display driving circuit to change a waiting time after outputting a vertical signal, based on the second parameter.

11. A method for changing a refresh rate of a display device of an electronic device, the method comprising:
identifying whether at least one of a request for changing a refresh rate and a change of restriction in changing the refresh rate is made;
changing at least one of a first parameter, a second parameter, and a third parameter, in response to identifying that the at least one of the request for changing the refresh rate and the change of restriction in changing the refresh rate is made; and
applying a changed parameter of the first parameter, the second parameter, and the third parameter,
wherein the first parameter is a frequency of a first synchronization signal formed in a display driving circuit of the display device,
wherein the second parameter is an increment or a decrement of a blank area in frame information to substitute for a portion of an active video area, and
wherein the third parameter is a frequency of a second synchronization signal for rendering.

12. The method of claim 11, wherein the third parameter is changed when the electronic device is under a visibility condition increasing a visibility of the change of the refresh rate.

13. The method of claim 12, wherein the visibility condition includes at least one of:
the electronic device being within an environment having lower illuminance of a predetermined threshold value or less;
the display device displaying a still image;
a screen size of the display device being greater than or equal to a predetermined threshold size; and
a leakage current of the display device being equal to or greater than a predetermined threshold current.

14. The method of claim 13, wherein the first parameter, the second parameter, or both the first parameter and the second parameter are changed when the visibility condition is absent.

15. The method of claim 11, wherein the third parameter is changed to a target refresh rate when an illuminance value identified using an illuminance sensor of the electronic device is equal to or less than a predetermined threshold value, and
wherein the first parameter or the second parameter is changed to the target refresh rate when the illuminance value is changed to be greater than the predetermined threshold value.

16. The method of claim 11, wherein a change of the first parameter and the second parameter is restricted when a touch input of a user is identified.

17. The method of claim 11, wherein a range for the change of the first parameter and the second parameter is restricted to 1/N of a present refresh rate, for an integer value N predetermined for a touch circuit of the electronic device, while a touch input of a user is identified by the touch circuit.

18. The method of claim 11, wherein the third parameter is changed when the electronic device requires a faster reaction rate.

19. The method of claim 11, wherein the display driving circuit of the electronic device is controlled to form the first synchronization signal based on the first parameter and to transmit the first synchronization signal to a display controller driver, and
wherein the display controller driver is controlled to form the second synchronization signal based on the third parameter and to transmit the second synchronization signal to a graphics module.

20. The method of claim 11, wherein a display controller driver controls the display driving circuit of the electronic device to change a waiting time after outputting a vertical signal, based on the second parameter.

* * * * *